Patented July 10, 1934

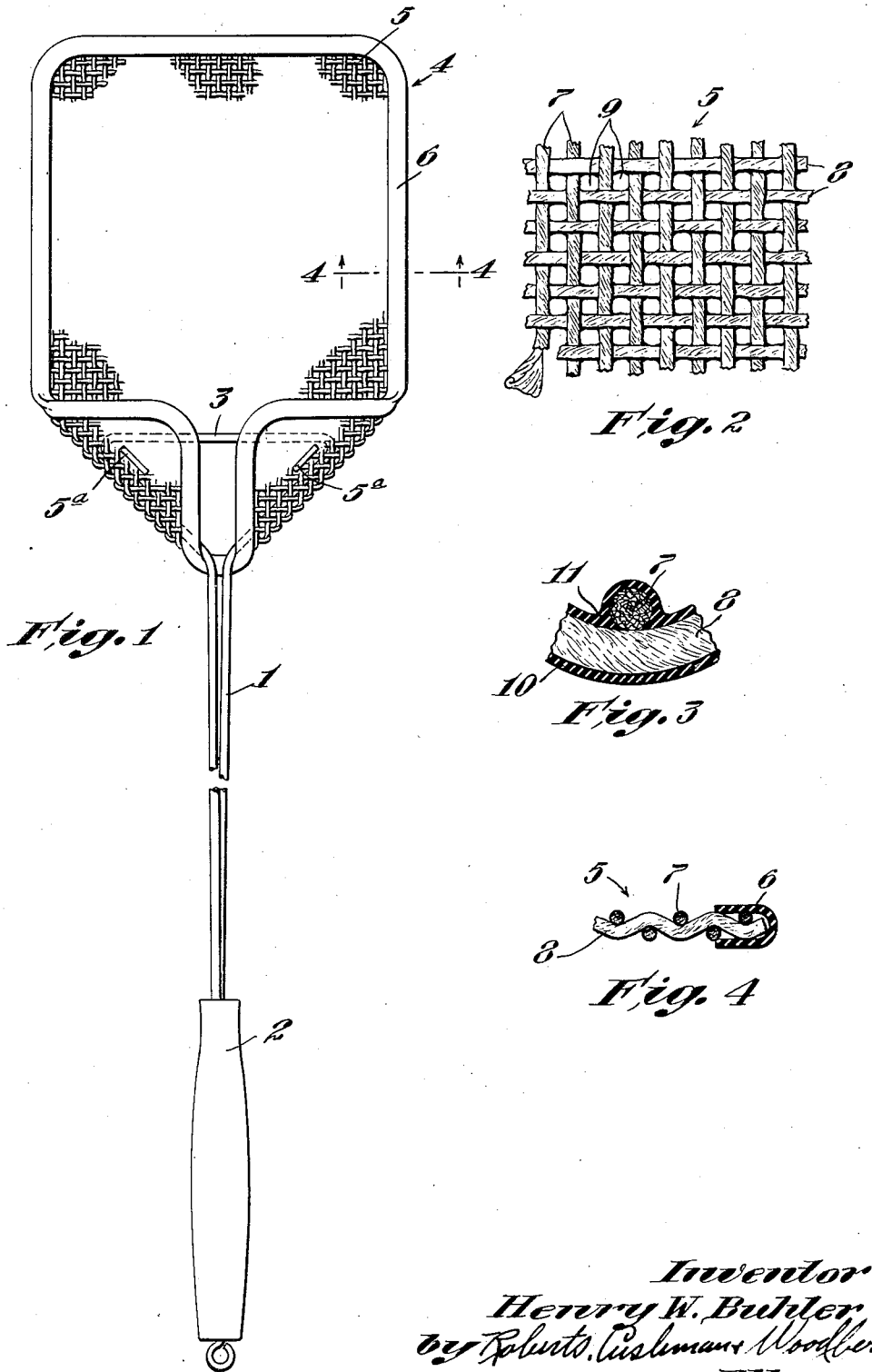

1,966,198

UNITED STATES PATENT OFFICE 1,966,198

FLY SWATTER

Henry W. Buhler, Gloucester, Mass.

Application January 7, 1932, Serial No. 585,201

2 Claims. (Cl. 43—137)

This invention relates to instruments for killing insects by impact and commonly known as "fly swatters." Usually such devices comprise a flexible paddle-like striking member carried by a long handle, the latter often having a widened frame portion at one end to facilitate attachment of the flexible striker member.

The desirability of reticulate or otherwise perforate material as the striking element of such an instrument has long been recognized, the openings in such material permitting free escape of air so that the insect is not warned of the impending blow or ejected from beneath the oncoming striker by air compressed in its advance, nor is the insect crushed so completely by a blow from such reticulate material as from that delivered by an imperforate striker. By reason of its cheapness and ready availability metallic fly-screen wire fabric has commonly been employed for this purpose. However, while such woven metallic screen fabric has certain advantages, for example, strength, resiliency, lightness, cheapness, etc., it is objectionable for this purpose by reason of its tendency to scar or otherwise deface finely finished woodwork, and when through long continued use some of its constituent strands break or are freed at their ends from the usual binding, the exposed sharp wire ends not only add to the damage of injury by scratching, but also tend to catch in draperies, curtains, and the like and to tear or otherwise injure the latter.

To avoid these defects in the wire striker, it has been proposed to form the striker of perforated sheet rubber, but in order to obtain the necessary stiffness the perforations must necessarily be made so small or the material of such thickness as to crush the fly against the surface upon which it rests, causing unsightly spots which are often difficult or impossible to remove. It has also been proposed to make the striker member of fabric woven from textile materials, and while such a striker is soft and not liable to injure fine furnishings, it is so flexible and flabby as to prevent striking an accurate blow and is so absorbent that after a period of use it becomes unsightly and unsanitary.

Among the objects of the present invention is to provide a novel fly swatter having a striker member possessing all of the advantages of the old woven wire striker, for example, its resiliency, open mesh, light weight, cleanliness, etc., but which will not cause injury to furnishings or fabrics. To this end I provide a woven reticular fabric, preferably consisting of hard twisted or braided paper twine or other suitable non-metallic material, and coat or impregnate the material with a substance which substantially adds to its normal stiffness and resiliency so as to make it acceptable for the intended purpose, and which at the same time, without unduly increasing its weight, or deleteriously reducing the area of its perforations, makes it waterproof and sanitary, adds substantially to its strength and durability, and imparts a pleasing and finished appearance.

In the accompany drawing I have illustrated a fly swatter embodying the present invention, and in the drawing, Fig. 1 is a front elevation of the complete swatter, a portion of the handle being broken away;

Fig. 2 is a fragmentary elevation showing a portion of the improved striker member to a large scale;

Fig. 3 is a fragmentary section, to greatly enlarged scale, showing a typical construction of the fabric at the intersection of two of its constituent strands; and Fig. 4 is a fragmentary section substantially on the line 4—4 of Fig. 1, illustrating an edge binding which may be employed for finishing the margin of the striker.

Referring to the drawing, the numeral 1 designates an elongate handle member which may be of any suitable material, for example, wire, having a grip member 2 at one end and preferably having the frame portion 3 at its other end, such frame portion being of any suitable shape and construction to facilitate attachment of the striker or to furnish desirable support for the butt end of the latter. In accordance with the present invention the openwork striker or body portion 5, which is of substantially the usual paddle shape, is provided with a binding 6 at its edge and is attached to the frame 3 by folding its lower corners inwardly, as shown in Fig. 1, and securing them to the body portion of the striker by means of staples 5$^a$ or other suitable fastening means. Obviously other ways of attaching the striker member to the handle may be employed if preferred and without departing from the spirit of the invention.

Referring more particularly to Figs. 2, 3 and 4, my improved striker member consists of a piece of woven reticular fabric consisting of warp threads 7 and weft threads 8, here shown as interwoven with a plain one-and-one weave, leaving the openings or reticulations 9. While this plain weave may be used, I contemplate that a leno weave or any other suitable method of associating the longitudinal and transverse strands so as to provide the desired openings or perforations may be employed. These strands consist of some cellulosic material which has no tendency to scar or otherwise injure surfaces with which it may be brought in contact. For this purpose I find that hard twisted or braided paper twine is very useful, although I contemplate that other materials usually of a fibrous vegetable nature, for example jute, hemp, or cotton twine may be employed.

Having prepared the fabric by weaving in any suitable manner, as just described, I next coat or impregnate the fabric with a suitable stiffening and waterproofing material. For the purpose of this invention it is essential that this stiffening and waterproofing material be of such type that when coated or impregnated therewith the fabric will not be so changed in character as to be harmful to finely finished surfaces when forcibly brought into contact therewith. At the same time, this coating or impregnating material should be of a type which will make the fabric stiff and resilient, since stiffness and resiliency is essential in such a striker member in order that a sharp and accurate blow may be struck.

Among other materials suitable for this purpose I may employ a fluid dispersion of rubber, and find that rubber applied in the form of rubber latex is eminently satisfactory, as this material may be made very fluid so as thoroughly to coat and/or impregnate the reticular woven fabric, but after vulcanization the rubber becomes strong, tough, durable resilient, and waterproof to an extent sufficient to impart the desired stiffness and elasticity to the otherwise rather flabby and inert material, and at the same time provides a striking surface which will not injure finely finished furniture. Obviously, other fluid dispersions of rubber, for example, rubber dispersed in naphtha or other highly volatile medium, may be employed if desired, although as stated, I prefer to use a water dispersion of rubber in the form of latex.

As shown in Fig. 3, this coating and impregnating material 10 covers the individual strands 7 and 8 and also connects the strands at their crossing points, as indicated at 11, thus very firmly uniting the strands and maintaining them in proper relative position and adding greatly to the strength, resiliency and durability of the striker. Moreover, the rubber coating 10 not only renders the striker waterproof so that it may be readily cleansed, but also provides a smooth, continuous, relatively soft and yielding surface which is free from crevices and other dirt collecting irregularities which tend to promote unsanitary conditions. Other stiffening media may be employed, for example certain preparations of glue (desirably rendered waterproof in any known manner) but to be acceptable for the purpose, the stiffening material must be durable, and particularly must be such as will not mar or injure objects against which the striker is impacted.

If desired, the binding 6, which is usually applied after the fabric has been cut to the proper size to form a striker, may also be of rubber or vulcanized latex and may be applied in any desired way, for example, by dipping the edge of the material in the proper solution and thereafter vulcanizing such edge, or by applying a binding strip of fabric to the edge. While a waterproof material is desirable as a binder in view of its sanitary character, I may under some circumstances prefer to employ a binder of different form or material, for example coated or uncoated textile fabric; or I may conceivably weave each striker as an independent unit having a selvage structure which needs no further binder, all as circumstances may warrant.

I claim:

1. A fly swatter comprising a handle and a striker carried thereby, said striker comprising a piece of reticular fabric, said fabric comprising interwoven strands of paper twine, said strands being coated and impregnated in the fabric, after weaving, with a fluid dispersion of rubber, the rubber being vulcanized in place on the interwoven strands thereby effectively securing these strands together at their crossing points in the fabric and providing an impervious, moisture resistant and stiffly resilient openwork structure having a smooth, relatively soft, yielding striking surface free from crevices and dirt collecting cavities and which is substantially harmless to polished surfaces, draperies and the like.

2. A fly swatter comprising a handle and a striker carried thereby, said striker comprising a reticular panel of interwoven strands of twisted cellulosic sheet material, said strands having a coating of vulcanized rubber which effectively secures said strands together at their crossing points and provides an impervious, waterproof and stiffly resilient openwork structure having smooth, relatively soft and yielding surfaces free from crevices and dirt collecting cavities.

HENRY W. BUHLER.